United States Patent [19]

Durham

[11] 4,155,869

[45] May 22, 1979

[54] PHOSPHATE ESTERS OF OXYALKYLATED BETA-AMINO LOWER-ALKYL CARBAMATES AS SCALE INHIBITORS

[75] Inventor: Daniel K. Durham, Sugarland, Tex.

[73] Assignee: Standard Oil Company (Indiana), Chicago, Ill.

[21] Appl. No.: 835,758

[22] Filed: Sep. 22, 1977

[51] Int. Cl.$^2$ .............................................. C02B 1/23
[52] U.S. Cl. .................................. 252/180; 252/175; 252/8.55 B; 252/82; 210/58; 422/15
[58] Field of Search ................. 252/180, 175, 8.55 B, 252/82; 21/2.7; 210/58

[56] References Cited

U.S. PATENT DOCUMENTS

| | | | |
|---|---|---|---|
| 2,842,523 | 7/1958 | Tousignant et al. | 260/77.5 C X |
| 3,620,974 | 11/1971 | Stamford | 252/180 X |
| 3,755,503 | 8/1973 | Stamford et al. | 252/180 X |
| 3,965,003 | 6/1976 | Stamford et al. | 252/180 X |

*Primary Examiner*—Mayer Weinblatt
*Attorney, Agent, or Firm*—Robert B. Stevenson

[57] ABSTRACT

The precipitation of scale-forming salts is inhibited by adding to an aqueous solution partially neutralized phosphate esters of an ethoxylated or propoxylated urea. The compositions are particularly useful in oil wells, oil well brines, cooling or boiler water, and the like.

7 Claims, 1 Drawing Figure

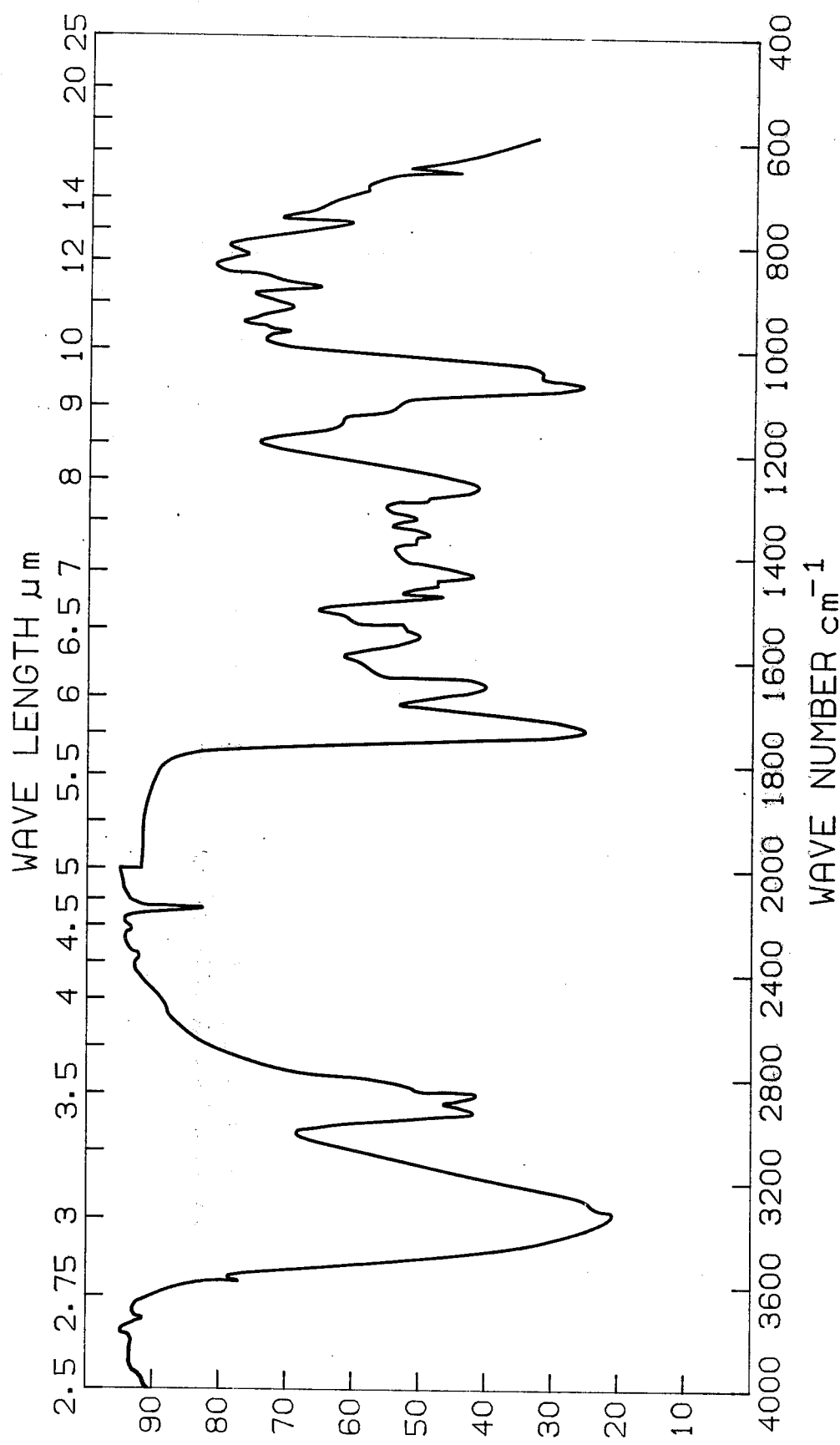

PHOSPHATE ESTERS OF OXYALKYLATED BETA-AMINO LOWER-ALKYL CARBAMATES AS SCALE INHIBITORS

BACKGROUND OF THE INVENTION

1. Field of the Invention

The present invention relates to the prevention of scale formation on metal surfaces in contact with hard-water brines. More particularly, it is concerned with preventing scale deposition in oil wells and associated equipment.

2. Description of the Prior Art

A variety of methods for inhibiting scale deposition in geologic formations and in oil or gas well equipment exposed to hard water or natural brines during the production of oil and gas have been suggested and utilized by the oil industry. Such processes and compositions have historically been the subject of many patents; for example, U.S. Pat. Nos. 3,429,824; 3,462,365; 3,487,018; 3,488,289 and 3,502,587 involve phosphate on phosphonate esters of oxyalkylated or oxyalkyl related compounds while U.S. Pat. Nos. 3,412,025; 3,477,956; 3,620,974; 3,557,001; 3,591,513; 3,597,352 and 3,617,578 involve phosphate or phosphonate esters of oxyalkylated or oxyalkyl related amine compounds. Furthermore, the problems associated with scale deposition from hard water present in oil wells and the like have historically been recognized and well documented in the patent literature; for example, see Chapter 3 of "Descaling Agents and Methods," by J. A. Szilard, copyright 1972 by Noyes Data Corporation, Park Ridge, N. J., Library of Congress Catalog Card No. 78-185161, for a patent survey with comments. In particular, French Pat. No. 2,290,505 discloses the monophosphate esters of monoethoxyl related urea compounds derived by phosphorylation of the reaction product of urea and an alkanolamine as scale inhibitors. However, scale problems continue to plague commercial oil and gas producing operations despite numerous suggested remedies.

SUMMARY OF THE INVENTION

In view of the above problem, I have discovered compositions and a method of using the new compositions involving the phosphate esters derived from an oxyalkylated urea which are effective in inhibiting scale deposition. These phosphate esters of oxyalkylated urea are particularly suitable for oil well applications and the like. When compared under controlled laboratory conditions to other commercially available products, the compositions of my invention show excellent tendency to suppress deposition of the most critical salt species which can cause problems in oil well applications. More particularly, I have discovered compositions which inhibit sulfate and carbonate scale formation in water comprised of a water-soluble partial salt of the phosphate acid esters of an ethoxylated or propoxylated urea.

BRIEF DESCRIPTION OF THE DRAWING

The drawing illustrates a typical infrared spectrum of a four mole ethylene oxide adduct of urea prior to phosphorylation.

DESCRIPTION OF THE PREFERRED EMBODIMENT

In carrying out my invention, the novel scale inhibitors are synthesized by first oxyalkylating urea in a manner such that at least two moles alkylene oxide are reacted per mole of urea. After oxyalkylation, the terminal hydroxyl groups are phosphorylated resulting in the phosphate esters of an oxyalkylated urea. This product can then be partially neutralized by the addition of a base or the like producing the water-soluble scale inhibitor compositions of my invention.

The oxyalkylation reaction can be carried out by any of the methods well-known in the art. The oxyalkylation as described in U.S. Pat. No. 2,842,523 is particularly useful provided 2 to about 20 moles of alkylene oxide are used per mole of urea. The infrared spectra of the oxyalkylation products, as illustrated in the drawing, indicate a mixture is produced including a significant contribution from the amino alkyl carbamate structure. Significant scale inhibition is observed with as little as 2 moles of alkylene oxide being added per mole of urea. The desired scale inhibition can be observed with as many as 20 moles of alkylene oxide per mole of urea present. The four mole alkylene oxide adduct is particularly suitable for purposes of my invention.

The phosphorylation of the oxyalkylated urea can be performed by any of the methods well-known in the art. The preferred method of synthesis is to react the oxyalkylated urea in the presence of a stoichiometric excess of polyphosphoric acid or its equivalent. The degree of phosphorylation ranges from about 1 to 6 or more moles of phosphate per mole of urea. In the cases where four or more moles of alkylene oxide are used per mole of urea, about six moles of phosphate per mole of urea represents a particularly advantageous stoichiometric excess in that it tends to drive the esterification reaction to completion while the remaining excess polyphosphoric acid need not be removed but can be carried along for additional corrosion inhibition. The reaction occurs essentially spontaneously after the reactants are heated. Since the reaction is exothermic, controlled addition of the reactants along with appropriate cooling to prevent over heating can be employed during the reaction.

Having synthesized the desired phosphate ester of an alkoxylated urea, it may be used directly as is or it may be partially neutralized by the addition of base and then added to the aqueous solution requiring treatment. A pH range of about 3 to about 7 is effective for scale inhibition with a pH of about 4.5 being preferred. The addition of sodium, potassium or ammonium hydroxide, anhydrous ammonia, a water soluble amine or their mixtures to achieve the desired pH is useful. Based on parts per million of the nonneutralized form, virtually total prevention of $CaCO_3$, $CaSO_4$, and $BaSO_4$ precipitation is achieved at as low as about 10 ppm.

Ethylene oxide is the preferred oxyalkylating agent. The four mole ethylene oxide adduct to urea is particularly preferred. Although my new inhibitor is highly effective when used alone, it can be combined with other materials (for example, aminophosphonates, inorganic polyphosphates, polyacrylates, organic acid, and the like) well-known in the art to produce special effects in scale and corrosion control. As such, the presence of other compatible known agents is viewed as being within the contemplated scope of the claims. Combinations of this nature are especially useful in cooling or boiler water applications. Having thus described the details of the preferred embodiment, the following examples plus comparative data are presented to illustrate the improved behavior of my invention under controlled laboratory conditions, and as such should not be interpreted as being unduly limiting.

EXAMPLE I

To a stirred 1500 mls oxyalkylation reactor fitted with an external cooling system was added 364.17 of urea and 2.25 grams of potassium hydroxide. The contents were then heated to 130° C. to melt the urea and then purged with nitrogen slowly for 1 hour until the water content was 1000 ppm or less and sealed under 25 psi. Ethylene oxide, 533.28 grams, was then reacted with the urea over a 4-hour period at a maximum pressure of 60 psi and a temperature range of 120° to 150° C. The ethoxylated urea was then cooled to 30° C. and removed from the reaction chamber. The yield was 99.8 percent. The final product was a viscous water white liquid.

To phosphorylate the above product, 287.16 grams of polyphosphoric acid was added to a 400 ml beaker equipped with a stirrer and heated to 60° C. using a hot plate. Then 250 grams of ethoxylated urea described above was dripped into the polyphosphoric acid over a 60 minute period with stirring. Due to the exotherm the reaction was cooled to maintain a temperature between 85° and 100° C. The viscosity increased with the increase in the amount of ethoxylated urea added. After the 250 grams of ethoxylated urea was added, the reaction temperature was held at 95° C. for 30 minutes. The clear water white, viscous liquid was cooled to 60° C. after which 273.06 grams of $H_2O$ was added. The product was then neutralized with 185.9 grams of 50% sodium hydroxide to a pH of 4.5 with cooling to control the exotherm from the neutralization. The resulting product was 50% active and the yield of reaction was 99.0 percent.

EXAMPLE II

A higher ethoxylate of urea was prepared using the same procedure as described in Example I. The amounts of urea, potassium hydroxides and ethylene oxide were 228.41 grams, 2.25 grams, and 669.34 grams, respectively. The final product was a dark red, clear viscous liquid. A yield of 99.8% was attained.

The phosphorylation and neutralization steps were essentially identical to Example I but the amounts of polyphosphoric acid, ethoxylated urea, water and 50% NaOH used were 205.08 grams, 94.92 grams, 167.3 grams, and 164.7 grams, respectively. The final pH was 4.3 and the product was a dark red liquid.

In order to evaluate the relative effectiveness of the phosphate esters of my invention as scale inhibitors, a series of laboratory tests was performed. The tests were conducted using the partially neutralized products produced according to EXAMPLE I and II. Three commercially available products known for their scale inhibition in oil production applications were similarly tested for comparison. The scale inhibition properties related to the most common problem salts were evaluated using two standardized laboratory calcium inhibition tests ($CaSO_4$ scale inhibition test and $CaCo_3$ scale inhibition test) and two standardized barium inhibition tests (high rate and low rate $BaSO_4$ scale inhibition tests). Data establishing the effectiveness of my compositions in these tests are presented in the following table

TABLE I $CaSO_4$ Scale Inhibition - Laboratory Precipitation Test - High Rate Sulfate Procedure

| Inhibitor | % Inhibition at Various Concentrations | | |
|---|---|---|---|
| | 5 ppm | 10 ppm | 20 ppm |
| Example I | 41.0 | 98.1 | 99.9 |
| Example II | 81.3 | 99.9 | 99.9 |
| Visco 953[1] | 99.8 | 99.9 | 99.9 |
| Wellaid 837[2] | 36.0 | 99.3 | 99.9 |
| Magna 214[3] | 39.8 | 79.4 | 99.6 |

[1] A commercially available phosphate ester scale inhibitor sold under the trade name Visco 953 by Nalco Chemicals.
[2] A commercially available phosphate ester scale inhibitor sold under the trade name Wellaid 837 by Amoco Chemicals Corporation.
[3] A commercially available acrylate polymer scale inhibitor marketed as Magna Calnox 214 by Magna Chemicals.

$CaCO_3$ Scale Inhibition - Laboratory Adherence Test

| Inhibitor | % Inhibition at Various Concentrations | | |
|---|---|---|---|
| | 3 ppm | 5 ppm | 10 ppm |
| Example I | 35.88 | 82.4 | 94.1 |
| Example II | 85.13 | 97.0 | 98.2 |
| Visco 953 | 39.0 | 57.0 | 99.9 |
| Wellaid 837 | 62.9 | 88.2 | 94.1 |
| Magna 214 | — | — | 80.7 |

High Rate $BaSO_4$ Scale Inhibition Laboratory Precipitation Test

| Inhibitor | % Inhibition at Various Concentrations | | |
|---|---|---|---|
| | 10 ppm | 20 ppm | 25 ppm |
| Example II | 96.2 | 97.0 | 99.1 |
| Visco 953 | 2.6 | 6.7 | 12.0 |
| Wellaid 837 | 41.9 | 90.8 | 92.7 |
| Magna 214 | 49.8 | 86.0 | 91.0 |

Low Rate $BaSO_4$ Test Laboratory Precipitation Tests

| Inhibitor | % Inhibition at Various Concentration | | |
|---|---|---|---|
| | 3 ppm | 5 ppm | 10 ppm |
| Example II | 98.0 | 98.1 | 98.7 |
| Visco 953 | 81.4 | 98.5 | 98.0 |
| Wellaid 837 | 62.1 | 81.9 | 96.7 |
| Magna 214 | | 10.7 | 84.0 |

In Table I, the relative percentage reduction of precipitation caused by the presence of various concentrations of inhibitor is tabulated as "% Inhibition." The higher the value, the more effective the inhibitor with 100% corresponding to total suppression of salt precipitation. As seen in the $CaSO_4$ results, the scale inhibitors of this invention essentially prevent $CaSO_4$ precipitation at about 10 parts per million (ppm) concentration, which compares favorably with the commercial alternatives. The 4 mole ethylene oxide adduct of urea shows significant $CaSO_4$ inhibition at as low as about 5 ppm. Similarly, the $CaCO_3$ data show essentially total inhibition of $CaCO_3$ precipitation at 10 ppm with significant inhibition at 5 ppm and 3 ppm for the 4 mole ethylene oxide adduct of urea. With respect to $CaCO_3$ inhibition the new products of this invention are superior to the listed commercial alternatives. The $BaSO_4$ data show essentially total inhibition of $BaSO_4$ precipitation at 10 ppm in both the high and low rate for the 4 mole ethylene oxide adduct of urea. Again, the new product of this invention shows a BaSO₄ inhibition which is superior to the listed commercial alternatives.

I claim:

1. A composition for inhibiting alkaline earth sulfate and carbonate scale formation comprised of a water-soluble partial salt of the phosphoric acid ester of an oxyalkylated urea wherein said oxyalkylated urea was prepared by reacting from two to about twenty moles of alkylene oxide per mole of urea.

2. A composition of claim 1 wherein said oxyalkylated urea is prepared by ethoxylating urea wherein from 2 to 20 moles of ethylene oxide are added per mole of urea.

3. A composition of claim 2 wherein the degree of phosphorylation is from about 1 to about 6 moles of phosphate per mole of urea.

4. A composition of claim 3 wherein said ethoxylated urea is the 2 mole adduct.

5. A composition of claim 3 wherein said ethoxylated urea is the 4 mole adduct.

6. A process for inhibiting sulfate and carbonate scale precipitation comprising adding to an aqueous medium an effective amount of a water-soluble partial salt of the phosphoric acid ester of an oxyalkylated urea wherein said oxyalkylated urea was prepared by reacting from two to about twenty moles of alkylene oxide per mole of urea.

7. A process of claim 6 wherein said oxyalkylated urea is selected from the group consisting of the 2 mole and 4 mole ethylene oxide adduct of urea.

* * * * *

UNITED STATES PATENT OFFICE
CERTIFICATE OF CORRECTION

PATENT NO. : 4,155,869
DATED : May 22, 1979
INVENTOR(S) : Daniel K. Durham

It is certified that error appears in the above-identified patent and that said Letters Patent are hereby corrected as shown below:

In References cited, under U.S. Patent Documents, Patent No. 3,620,974 11/1971, "Stamford" should read --Stanford--. Patent No. 3,755,503 8/1973, "Stamford" should read --Stanford--. Patent No. 3,965,003 6/1976 "Stamford" should read --Stanford--.

Column 3, line 65, "CaCo3" should read --$CaCO_3$--.

Signed and Sealed this

Twenty-third Day of October 1979

[SEAL]

Attest:

RUTH C. MASON
Attesting Officer

LUTRELLE F. PARKER
Acting Commissioner of Patents and Trademarks

UNITED STATES PATENT AND TRADEMARK OFFICE
CERTIFICATE OF CORRECTION

PATENT NO. : 4,155,869
DATED : May 22, 1979
INVENTOR(S) : Daniel K. Durham

It is certified that error appears in the above—identified patent and that said Letters Patent are hereby corrected as shown below:

In References Cited, under U. S. Patent Documents, Patent 3,620,974 11/1971 "Stamford" should read -- Stanford --, Patent 3,755,503 8/1973 "Stamford" should read -- Stanford --, Patent 3,965,003 6/1976 "Stamford" should read -- Stanford --.

Column 1, line 22, "on" should read -- or --.

Column 3, line 65, "CaCo$_3$" should read -- CaCO$_3$ --.

This certificate supersedes Certificate of Correction issued October 23, 1979.

Signed and Sealed this

Twentieth Day of November 1979

[SEAL]

Attest:

RUTH C. MASON
Attesting Officer

LUTRELLE F. PARKER
Acting Commissioner of Patents and Trademarks